United States Patent
Haferbeck et al.

(10) Patent No.: US 6,198,737 B1
(45) Date of Patent: Mar. 6, 2001

(54) METHOD FOR THE TRANSMISSION OF INFORMATION IN A UNIVERSAL TRANSMISSION NETWORK

(75) Inventors: Ralf Haferbeck, Unterschleissheim; Detlef Ernst, Oberhaching, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/077,786

(22) PCT Filed: Dec. 2, 1996

(86) PCT No.: PCT/DE96/02305

§ 371 Date: Jun. 5, 1998

§ 102(e) Date: Jun. 5, 1998

(87) PCT Pub. No.: WO97/23098

PCT Pub. Date: Jun. 26, 1997

(30) Foreign Application Priority Data

Dec. 19, 1995 (DE) .............................. 195 47 467

(51) Int. Cl.$^7$ .................................... H04L 12/28
(52) U.S. Cl. .................. 370/351; 370/328; 375/349; 455/422
(58) Field of Search ................... 370/331, 338, 370/349, 328, 346, 347, 348; 455/403, 436, 438, 422, 439, 440, 442, 443

(56) References Cited

U.S. PATENT DOCUMENTS

| | | |
|---|---|---|
| 5,101,501 | 3/1992 | Gilhousen et al. . |
| 5,579,370 | * 11/1996 | Fukushima et al. ............... 455/440 |
| 5,629,974 | * 5/1997 | Rajala et al. ...................... 455/466 |
| 5,761,619 | * 6/1998 | Danne et al. ...................... 455/422 |
| 5,926,757 | * 7/1999 | Luijten et al. ..................... 455/422 |

FOREIGN PATENT DOCUMENTS

| | | |
|---|---|---|
| 0 577 960 | 1/1994 | (EP) . |
| 0 643 542 | 3/1995 | (EP) . |
| 0 679 042 | 10/1995 | (EP) . |
| WO 94/01975 | 1/1994 | (WO) . |

OTHER PUBLICATIONS

IEEE Journal on Selected Areas in Communications, vol. 12, No. 5, (1994), M.J. McTiffin et al, Mobile Access to an ATM Network Using a CDMA Air Interface, pp. 900–908.

Globecom, Nov. 28, 1994, L. Van Hauwermeiren et al, "Requirements for Mobility Support in ATM", pp. 1691–1695.

Telcom Report 18, No. 2, (1995) Josef Franz Huber, "Mobilkommunikation auf Expansionskurs", pp. 52–55.

* cited by examiner

*Primary Examiner*—Hassan Kizou
*Assistant Examiner*—Inder Pal Mehra
(74) *Attorney, Agent, or Firm*—Schiff Hardin & Waite

(57) ABSTRACT

The combination point (for example, CP1) at which the two last transmission paths are combined or the single transmission path is divided is selected by a central control means (SCP) in the transmission network, which is informed of all combination points (CP1, CP2) at which two redundant transmission paths are respectively combined or a single transmission path is divided, as interworking point (IWP) in the transmission network at which mobile radiotelephone network-specifically encoded information contained in the transmission frame are converted into fixed network-specifically encoded information. Given dynamic change of the number of redundant transmission paths (macro diversity), the interworking point for the conversion of the mobile radiotelephone network-specifically encoded information into fixed network-specifically encoded information can be localized and flexibly determined where a combination point combines the last two transmission paths or, respectively, divides the individual transmission path.

7 Claims, 3 Drawing Sheets

METHOD FOR THE TRANSMISSION OF INFORMATION IN A UNIVERSAL TRANSMISSION NETWORK

BACKGROUND OF THE INVENTION

The invention is directed to a method for the transmission of information in a universal transmission network in which mobile radiotelephone-specific and fixed network-specific functions are implemented.

The article "Mobilkommunikation auf Expansionskurs", in telcom report 18 (1995), No. 2, pages 52 through 55, discloses universal transmission networks (UMTS Universal Mobile Telecommunications System, FPLMTS Future Public Land Mobile Telecommunications System) in which different networks and network services are combined for person-related mobile telecommunication. A universal access to a transmission network in which mobile radiotelephone network related and fixed network related functions are implemented for voice, data and image communication thereby arises for the network subscribers, whether mobile radiotelephone subscribers or fixed network subscribers.

As known, the radiotelephone station of a network subscriber can transmit the same information on a plurality of redundant transmission paths that are set up parallel via a radio transmission interface from the network to the radiotelephone subscriber station or from the radiotelephone subscriber station to the transmission network (macro diversity) in order to achieve an optimally good transmission quality. This means that the signaling and/or useful information that are usually inserted into one or more transmission frames are received by a plurality of radio equipment, for example base transmission/reception stations of the transmission network. The information transmission via parallel redundant transmission paths is applied, for example, given a radio transmission interface that uses the CDMA access method (Code Division Multiple Access) according to U.S. Pat. No. 5,101,501. The redundant transmission paths can be dynamically set up and cleared down while the radiotelephone subscriber station changes its location. An operation in this transmission mode (macro diversity) is also possible over a longer time span given a stationary radiotelephone subscriber station.

In an ATM network with a utilization of a radio interface for the transmission of information from or, respectively, to a mobile station, EP-A-0 679 042 discloses that an improved transmission quality be obtained by a setup of redundant paths by the mobile station. The higher transmission capacity thereby required for the transmission of ATM cells in the access network between base stations with which the mobile station is in radio communication and a mobile network interface unit is reduced in that sub-networks are formed in the access network and redundant paths are combined or, respectively, divided in their interfaces (sub-network interfaces).

The information that are sent out by the radiotelephone subscriber station in the transmission frames on various transmission paths can be merged in the transmission network at combination points at which respectively two transmission paths are combined into a single transmission path in the one transmission direction (uplink) and the single transmission path is divided into two transmission paths in the other transmission direction (downlink). The plurality and distribution of the combination points onto network elements of the transmission network changes dynamically with the addition or, respectively, removal of redundant transmission paths that can be additionally set up or, respectively, in turn cleared down by the radiotelephone subscriber station.

For a best possible utilization of the network elements of the universal transmission network, it is necessary to determine a transition point at which mobile radiotelephone-specifically encoded information must be converted into fixed network-specifically encoded information. Since the transition point terminates all mobile radiotelephone-specific functions, a conversion can only ensue following all combination points given the presence of a plurality of redundant transmission paths in the transmission network. Changes in the plurality and distribution of the combination points and, thus, in the determination of the transition point in the transmission network derive due to the dynamic addition and removal of redundant transmission paths.

SUMMARY OF THE INVENTION

It is therefore an object of the present invention to specify a method with which the transition point in the transmission network can be flexibly determined given dynamic set up or, respectively, clear down of redundant transmission paths (macro diversity).

A combination point at which the two last transmission paths are combined is selected by a central control means of the transmission network, which is formed of all combination points, as sole combination point in the transmission network at which mobile radiotelephone network-specifically encoded information contained in the transmission frame are converted into fixed network-specifically encoded information. The transition point for the conversion of the mobile radiotelephone network-specifically encoded information into fixed network-specifically encoded information can thus by dynamically localized and flexibly determined where a combination point combines the last two transmission paths or divides the single transmission path. As a result of the inventive method, it is assured given dynamic setup and cleardown of redundant transmission paths on the radio transmission interface that the transition point is located in a network element of a network level that lies optimally close to the radiotelephone subscriber station.

Given modification of the transition point caused by a setup of an additional transmission path or by a cleardown of an existing transmission path, the combination point that becomes the new transition point according to a development of the invention is requested to implement the conversion by the central control means in a signaling message.

According to another development of the invention, the combination point that hitherto implemented the conversion is requested to desist from the conversion by the central control means in a signaling message.

An additional signaling outlay in the form of the signaling messages is required for determining the new transition point with the central control means due to the setup of an additional transmission path or the cleardown of an existing transmission path. However, no additional information with reference whereto the transition point can be determined need be entered in the transmission frame therefor.

It is advantageous when a service control location that is involved in the transmission network for the executive sequencing of services is employed as central control means.

According to a development of the invention, the transition point can be placed into a radio equipment or into a switching equipment of the universal transmission network.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
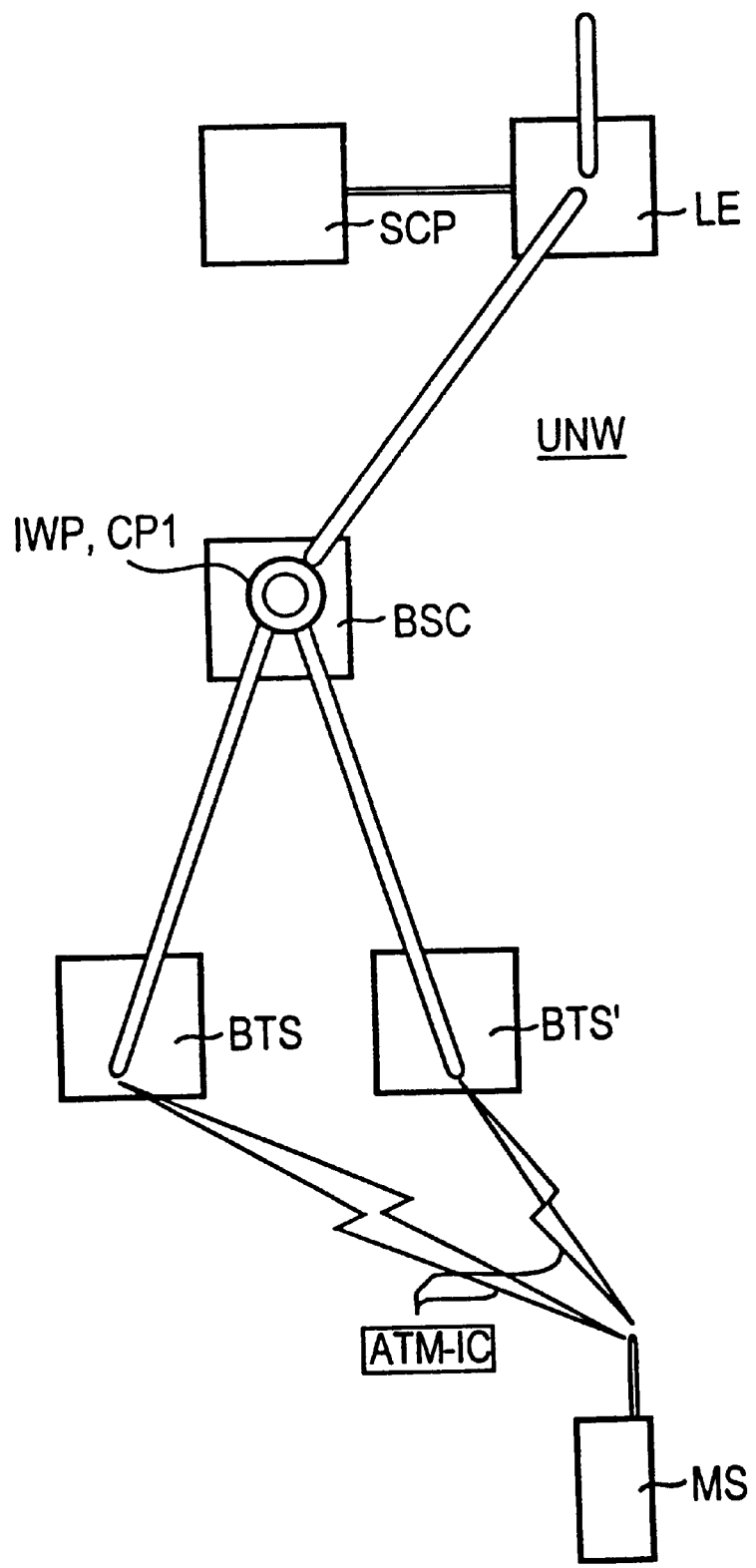
FIG. 1 two different redundant transmission paths that are combined in the transmission network at a combination point that is the transition point.
Figure 2:
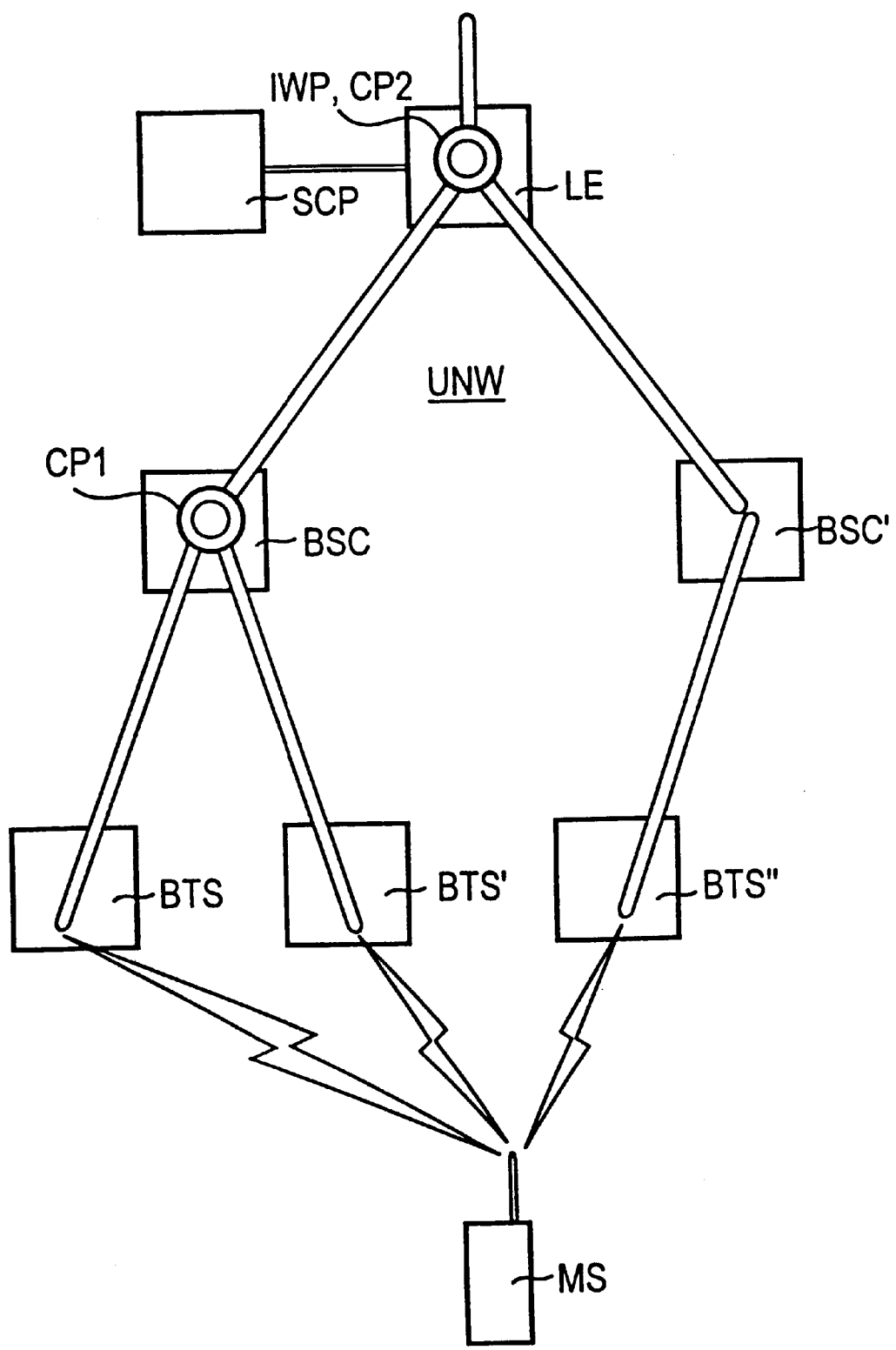
FIG. 2 three redundant transmission paths after setup of an additional transmission path that leads to a change of the transition point in the transmission network.

In a respective block circuit diagram, FIGS. 1 and 2 depict the network elements of a universal transmission network UNW in which both mobile radiotelephone network-specifically encoded information as well as fixed network-specifically encoded information are transmitted for person-related mobile communication between network subscribers. The universal transmission network UNW enables a person-related mobile communication for the network subscribers of different access networks such as, for example, mobile radiotelephone network and fixed network, independently of the respective access network. In the present example, the transmission network UNW according to FIG. 1 comprises a plurality of radio equipment BTS, BTS', at least one control means BSC and at least one switching equipment LE as network elements. Of course, further network elements are present, but these are not necessary for an understanding of the invention. The radio equipment BTS, BTS' receive the information that are sent to the network from a radiotelephone subscriber station MS in the upstream transmission direction (uplink) and send the information that are received from the transmission network (downlink) in the downstream transmission direction, respectively via a radio transmission interface. Each radio equipment BTS . . . thereby usually serves a radio cell that represents the smallest radio coverage area in a cellularly constructed network. Due to the employment of directional antennas at a location of the radio equipment BTS . . . a radio cell can be divided into two or more sectored cells that the network treats like ordinary radio cells.

The control means BSC assumes the radio-oriented control functions in the transmission network such as, for example, the radio processing functions, the administration of the radio equipment, the radio channel administration, etc. Each control means BSC thereby serves one or more radio equipment BTS, BTS'. The switching equipment LE that is arranged in the switching system of the transmission network in addition to other switching equipment is connected to the control means BSC. The switching system thereby assumes all mobile radiotelephone network-related and fixed network-related switching functions that relate to the setup and cleardown of call connections, the routing in the universal transmission network. In the present example, the switching equipment LE is composed of a local switching equipment (local exchange) as employed, for example, for switching in locally limited areas of a fixed network. A service control point SCP that is involved in the transmission network for the executive sequencing of services for the network subscribers is connected to the local exchange LE. As intelligent central control means, it comprises the service logic and the data for the implementation of the services.

The radio subscriber station MS works in a transmission mode wherein a plurality of redundant transmission paths to the radio equipment are set up parallel at the same point in time for a logical connection (macro diversity). The setup and cleardown of redundant transmission paths can ensues by the network in the downstream transmission direction (downlink) or by the radiotelephone subscriber station in the upstream transmission direction (uplink). In the present example, the same information, which are entered in mutually corresponding transmission frames, are received via the radio transmission interface by the radio equipment BTS, BTS' in parallel on two redundant transmission paths. The information thereby contain mobile radiotelephone network-specifically encoded information that can be both signalling information as well as voice and data information. In that a total of m+1 transmission paths have been set up parallel from the radiotelephone subscriber station MS, a total of m combination points are required for the combination of respectively two transmission paths in the transmission network. Due to the total of m+1=2 redundant transmission paths, the information of two incoming transmission frames are respectively combined to information in one outgoing transmission frame at m=1 combination points CP1 in the transmission network. The information about how many combination points are necessary and in which network elements they are located are stored in the central control means SCP and offered by it as needed. Since the central control means SCP is informed about all combination points in the network, it selects the combination point CP1 at which the two last transmission paths are combined as transition point (interworking point) IWP in the transmission network at which the mobile radiotelephone network-specifically encoded information contained in the transmission frame are converted into fixed network-specifically encoded information.

In the present example, the mobile radiotelephone network-specifically encoded information are located in a transmission frame that is an information cell ATM-IC formed according to the asynchronous transfer mode (ATM). As known, every ATM information cell ATM-IC comprises a header field (header) having the length of 5 bytes and an information field (payload) having the length of 48 bytes. The mobile radiotelephone network-specifically encoded information can also be transmitted in information blocks according to a synchronous or plesiochronic transfer mode (SDH or PDH).

FIG. 2 shows a total of three redundant transmission paths, the additional path thereof compared to FIG. 1 having been added by the radiotelephone subscriber station MS. This means that two redundant transmission paths lead from the radiotelephone subscriber station MS to the radio means BTS and BTS' and a third transmission path leads therefrom to a further radio means BTS" via the radio transmission interface. The radio means BTS and BTS' forward the two incoming transmission frames with the identical information to the control means BSC on two transmission paths. The radio means BTS" likewise sends the same information in the corresponding transmission frame to a further control means BSC' via the third transmission path. In the control means BSC, the identical information incoming on the two transmission paths are combined at the combination point CP1. The combination point CP1, however, is no longer the interworking point since the number of combination points has increased due to the additionally setup transmission path, so that the last two transmission paths are no longer combined at the combination point CP1.

The information that the control means BSC' receives on the third transmission path are immediately forwarded to the switching equipment LE without a combining of redundant transmission paths being required at a combination point in the control means BSC'. The two individual transmission paths that were set up by the control means BSC and BSC' are combined at a second combination point CP2 in the switching equipment LE. The information contained in the two incoming transmission frames are in turn combined and entered into an outgoing transmission frame that the switching equipment LE sends out on an individual connection path. The combination point CP2 in the switching equipment LE forms the new interworking point IWP at which the mobile radiotelephone network-specifically encoded information are converted into fixed network-specifically encoded information for further processing in succeeding network elements of the transmission network. The central control means SCP thereby requests that the new interworking point IWP implement the conversion, whereas the previous interworking point, the combination point CP1, is informed by the central control means SCP that the mobile radiotelephone network-specifically encoded information are not to be converted. The remain unmodified and are sent to the switching equipment LE in the outgoing transmission frame. The information exchange between the central control means SCP and the new interworking point as well as the old interworking point ensues with corresponding signalling messages.

Figure 3:
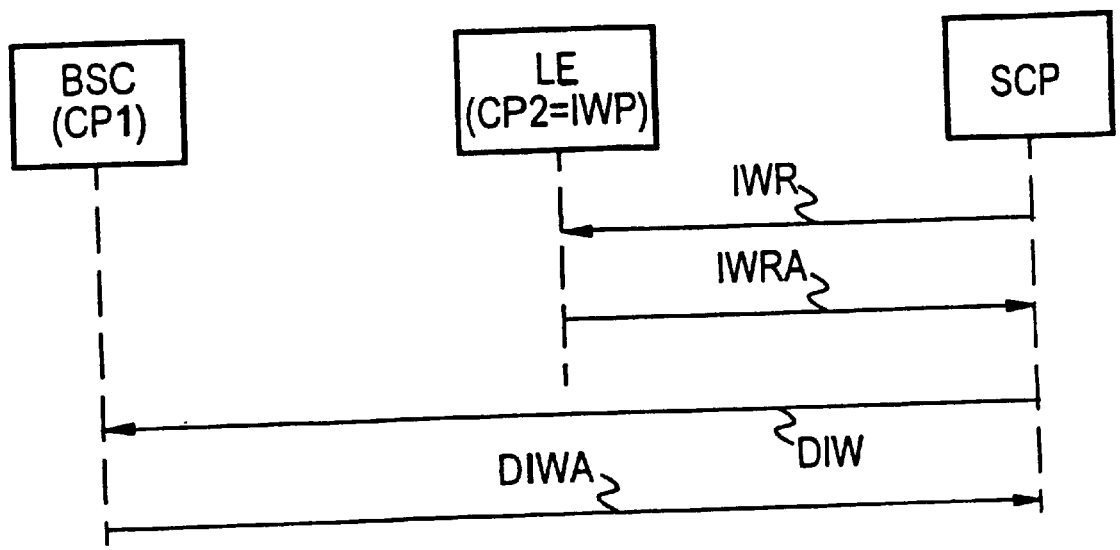
FIG. 3 the signalling messages in the transmission network given addition of an additional transmission path.

FIG. 3 shows the signalling flow between the network elements or, respectively, combination points after addition of a further transmission path—according to FIG. 2. The central control means SCP transmits a signalling message IWR to the switching equipment LE in which the combination point CP2 is defined as new interworking point IWP. The signalling message IWR contains the request for the conversion of the mobile radiotelephone network-specifically encoded information contained in the transmission frame. The switching equipment LE acknowledges the request for conversion in a signalling message IWRA that is sent back to the central control means SCP in the opposite direction. The control means BSC, in which the old interworking point that previously implemented the conversion was formed by the combination point CP1, is informed to desist from the conversion be the central control means SCP in a signalling message DIW. The control means BSC also reports the reception of the signalling message DIW by returning a signalling message DIWA.

Figure 4:
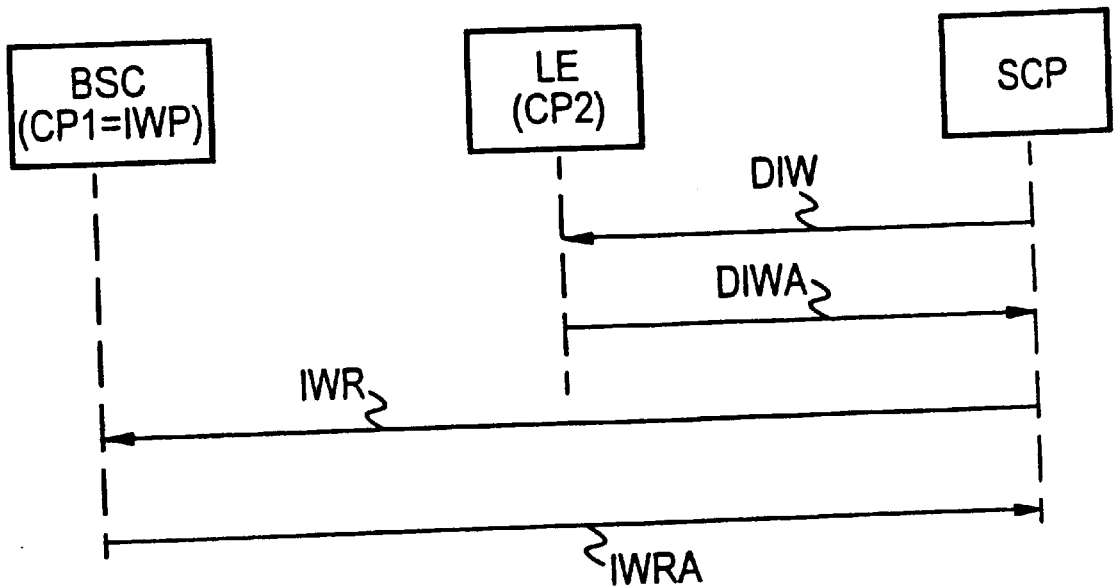
FIG. 4 the signalling messages in the transmission network given removal of an existing transmission path.

After removal of a redundant transmission path in the arrangement according to FIG. 3, the arrangement according to FIG. 2 arises in which only the two redundant transmission paths are now combined at the single combination point, which is also the interworking point. FIG. 4 shows the signalling flow between the network elements after cleardown of an existing transmission path. The signalling message DIW with the request to no longer implement the conversion and the signalling message DIWA for acknowledgment of the request are exchanged between the central control means SCP and the switching equipment LE that contained the previous interworking point the combination point CP2. The central control means SCP transmits the signalling message IWR to the control means BSC that comprises the sole combination point CP1 as new interworking point IWP. The signalling message IWR contains the request for the conversion of the mobile radiotelephone network-specifically encoded information contained in the transmission frame. After reception of the request, the control means BSC returns the signalling message IWRA to the central control means SCP for acknowledgment.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method for transmitting information in a universal transmission network having mobile radiotelephone network-specific functions and fixed network-specific functions, combining at combination points common information that is transmitted in transmission frames between the transmission network and a radiotelephone subscriber station on different redundant transmission paths that are set up parallel via a radio transmission interface to the transmission network, at the combination points respectively two transmission paths being combined to a single transmission path in one transmission direction and an individual transmission path being divided into two transmission paths in the other transmission direction; selecting a respective combination point, at which two last transmission paths are combined or a single transmission path is divided, by a central controller in the transmission network, which is informed of all combination points, as sole interworking point in the transmission network at which mobile radiotelephone network-specifically encoded information contained in a transmission frame is converted into fixed network-specifically encoded information.

2. The method according to claim 1, wherein given change of the interworking point due to a setup of an additional transmission path or due to a cleardown of an existing transmission path, a further combination point that becomes a new interworking point is requested to implement conversion of the interworking point being requested by the central controller in a signaling message.

3. A method according to claim 2, wherein the combination point that previously implemented a conversion is requested by the central controller in a signaling message to desist from the conversion.

4. A method according to claim 1, wherein the central controller is a service control point that is involved in the transmission network for executive sequencing of services.

5. A method according to claim 1, wherein the interworking point is located in one of a radio or switching equipment of the transmission network.

6. A method according to claim 1, wherein mobile radiotelephone network-specifically encoded information is transmitted in the transmission frame; and wherein an information cell to be transmitted according to asynchronous transfer mode is respectively employed as the transmission frame.

7. A method according to claim 1, wherein mobile radiotelephone network-specifically encoded information is transmitted in the transmission frame; and wherein an information block to be transmitted according to a synchronous transfer mode is respectively employed as the transmission frame.

* * * * *